(12) United States Patent
Zhao et al.

(10) Patent No.: US 11,603,935 B2
(45) Date of Patent: *Mar. 14, 2023

(54) MECHANICAL SEAL FOR LIQUID WITH AN AXIALLY FLOATING TRAY SLEEVE INSIDE

(71) Applicant: AIGI Environmental Inc., Nanjing (CN)

(72) Inventors: Jingwei Zhao, Nanjing (CN); Jun Zhang, Nanjing (CN)

(73) Assignee: AIGI ENVIRONMENTAL INC., Nanjing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/555,669

(22) Filed: Dec. 20, 2021

(65) Prior Publication Data
US 2022/0112956 A1    Apr. 14, 2022

Related U.S. Application Data

(62) Division of application No. 16/554,560, filed on Aug. 28, 2019, now Pat. No. 11,268,617.

(51) Int. Cl.
*F16J 15/34* (2006.01)
(52) U.S. Cl.
CPC ................ *F16J 15/3472* (2013.01)

(58) Field of Classification Search
CPC ...... F16J 15/34; F16J 15/3464; F16J 15/3472; F16J 15/348; F16J 15/3492
See application file for complete search history.

(56) References Cited

U.S. PATENT DOCUMENTS

| | | | | |
|---|---|---|---|---|
| 7,870,654 B2 * | 1/2011 | Kametaka | ............ | F16J 15/3476 29/525.04 |
| 2001/0045701 A1 * | 11/2001 | Toal | ..................... | F16J 15/3464 277/370 |

* cited by examiner

*Primary Examiner* — Gilbert Y Lee
(74) *Attorney, Agent, or Firm* — Grogan, Tuccillo & Vanderleeden, LLP

(57) ABSTRACT

A mechanical seal for sealing against a rotating shaft includes a static ring positioned about the shaft and a movable ring positioned about the shaft and in sliding contact with the static ring. The movable ring is rotatable with the shaft and a tray sleeve is attached to one of the movable ring and the static ring, with the tray sleeve being selectively movable in an axial direction along the shaft. Wear between the static ring and the movable ring causes the tray sleeve to move in the axial direction. The tray sleeve includes an indicator and relative movement of the indicator along the shaft is in proportion to the wear between the static ring and the movable ring.

10 Claims, 5 Drawing Sheets

MECHANICAL SEAL FOR LIQUID WITH AN AXIALLY FLOATING TRAY SLEEVE INSIDE

CROSS-REFERENCE TO RELATED APPLICATIONS

This application is a Divisional Application of U.S. Ser. No. 16/554,560 filed Aug. 28, 2019, which claims priority to Chinese Patent Application Ser. No. CN201910284822.X filed on 10 Apr. 2019 all of which are herein incorporated by reference.

TECHNICAL FIELD

The invention relates to a mechanical seal for fluid, in particular to a mechanical seal for liquid with an axially floating tray sleeve inside between a rotating shaft and a shell of a rotating apparatus.

BACKGROUND

In the prior art, the forms of the fluid seal include packing seal, rubber seal, dry gas seal and mechanical seal. The packing seal is a kind of seal in close contact with the shaft via the radial force produced by the plastic deformation of the packing under the pressure of the fixing part. The packing seal wears the shaft and has a small amount of leakage. Rubber ring seal is made from a rubber material with high elasticity, which causes large deformation when given small stress. The deformation can provide contact pressure, compensate for leakage clearance to achieve sealing. Rubber ring seal is mostly used for reciprocating hydropneumatic seal or rotating oil seal with little pressure. Packing seal and rubber ring seal are not mechanical seal. Mechanical seals are defined in the relevant national standards as "devices for preventing fluid leakage consisting of at least one pair of end faces perpendicular to the axis of rotation, which keep fit and slide relative to each other under the application of the fluid pressure and the elastic (or magnetic) force of the compensating mechanism in combination with the auxiliary seals", which are different from the above two kinds of seals. The material of mechanical sealing ring is rigid material, thus it is necessary to compensate elastic force or magnetic force behind it. On the contrary, the elasticity or filler material can not be designed and implemented according to the above-mentioned national standards due to the high resistance. Generally, the mechanical seal for fluid is a contact seal of sealing ring, and non-contact dry gas seal is used in special applications, which produces a rigid and stable gas film on the two sealing surfaces, so that the two sealing surfaces are completely separated and maintain a certain sealing gap, but the cost is expensive and the maintenance is complicated. For the above packing seal, rubber seal and dry gas seal, the first two kinds have gradually become obsolete due to the high friction and shaft wear, and are only used in the situation where mechanical seals are not suitable. As for the dry gas seal, its usage is limited by the cleanness of the media and high cost. The invention relates to the field of contact mechanical seal for fluid.

Although the common sealing forms of contact mechanical seals for pumps are various in design, there are problems in real-time monitoring, early warning and safety precaution of the effective performance of the internal seal operation. The reason is that the dynamic and static sealing rings can seal the liquid only when they are in the fluid equipment, and they must be closed to avoid liquid leakage and splash. This is a necessary rational design, but the problem with this design is that the actual operation of the sealing ring cannot be observed during operation, and the sealing surface is known to be completely worn only after leakage. In fact, before the leakage occurs, the dynamic and static sealing rings have gradually become thinner due to wear and the spring thrust has also gradually disappeared due to the change of position. The whole process changes dynamically in the closed equipment. This situation makes it impossible to replace the seal in advance and can only be replaced after a safety hazard has occurred. Especially when the liquid is a dangerous medium, even a small amount of leakage causes great safety hazards to personnel and factories. The invention aims to solve the problem of on-line observation.

SUMMARY

The purpose of the invention: in order to solve the problem of inadequate safety in the existing mechanical seals for liquids, the invention provides a mechanical seal for liquid with an axially floating tray sleeve. The wear amount of seal of the mechanical seal can be observed externally, that is, the wear amount of seal surface can be determined before leakage, thereby realizing early-warning monitoring on the effectiveness and safety of internal seal operation, and preventing the safety accident caused by seal failure under dynamic operation condition of mechanical seal.

Technical scheme: the invention discloses a mechanical seal for liquid with an axially floating tray sleeve inside, comprising a static ring, a movable ring, a locking ring and a tray sleeve, wherein the static ring is connected to a cover and a shell to be stationary, the movable ring is fixed with a shaft or a shaft sleeve through the locking ring and rotates, and the contact end faces of the movable ring and the static ring form a sealing face which is vertical to and slides against the shaft; the tray sleeve is between a sealing ring and the shaft or shaft sleeve in the direction vertical to the shaft, and parallel to the axis along the axial direction; the tray sleeve is connected to the movable ring or the static ring near an inner end of the liquid in the axial direction; the tray sleeve extends out of the cover in the axial direction near the air end.

Specifically, the portion of the tray sleeve except the portion extending out of the cover in the axial direction near the air end is provided with a warning sign, scale or color band or projection.

Specifically, the tray sleeve is connected to the movable ring or the static ring in the axial direction near the inside end of the liquid to be in inlaid rigid connection, or bonded, or boss connection arranged between the sealing ring and the spring; the connection fixes the axial and radial displacements of the tray sleeve within the mechanical seal.

The movable and static rings are integral or separate, or one ring is integral and the other ring is separate.

Preferably, the mechanical seal for liquid with an axially floating tray sleeve inside comprises a cover, a shaft sleeve, a shaft sleeve locking ring and a detachable positioning block between the shaft sleeve and the cover, thereby forming a cartridge mechanical seal.

Specifically, the spring is any one of a large cylindrical spring, a small coil spring, a wave plate spring, a bellows spring or a disc spring. The front end, the rear end or the front and rear ends of the spring are provided with retaining rings for balancing elastic force or preventing falling off.

The tray sleeve is made from hard materials, and the hard materials comprise metal, plastic, silicon carbide, composite material or a combination of the above materials.

Working principles: the mechanical seal for liquid with an axially floating tray sleeve inside is provided with an axially floating tray sleeve disposed in parallel between the sealing ring and the shaft, an end of the tray sleeve near the liquid is connected to a sealing ring, which can be a movable or static ring. The other end is exposed on the air side, a warning sign band is also provided on the circumferential surface of the exposed portion, and the bandwidth corresponds to the effective wear of the sealing ring; when the exposed portion of the tray sleeve enters or extends out of the sealing body due to the wear of the sealing ring, the axial width of the warning sign band is partially exposed, all exposed or unexposed, warning the actual operating condition of the seal, and effectively monitoring seal safety performance and giving early warning of seal failure. The mechanical seal also provides a split sealing ring replacement design, which facilitates emergency handling and widespread application. On the basis of ensuring the effectiveness and reliability of the seal, the setting for preventing seal failure and the safety warning are provided. The invention is innovative in design form and ingenious in conception, is of great significance on safe production, and is economic and practical.

Compared with the prior art mechanical seal for liquid, the mechanical seal for liquid with an axially floating tray sleeve inside disclosed in the invention has the following advantages:

(1) Through the axial floating displacement of the tray sleeve, the dynamic observation of the wear of the sealing ring can be realized;
(2) The exposure of the bandwidth of the tray cover warning sign is used to warn the effective performance of the internal sealing operation; to prevent safety accidents caused by seal failure;
(3) The split seal ring replacement design is provided to meet a wide range of working conditions.

DETAILED DESCRIPTION

The invention will be further described below in conjunction with the attached drawings. The following embodiments are only intended to illustrate the technical solution of the invention more clearly, and are not intended to limit the scope of the present invention.

EMBODIMENT I

Figure 3:
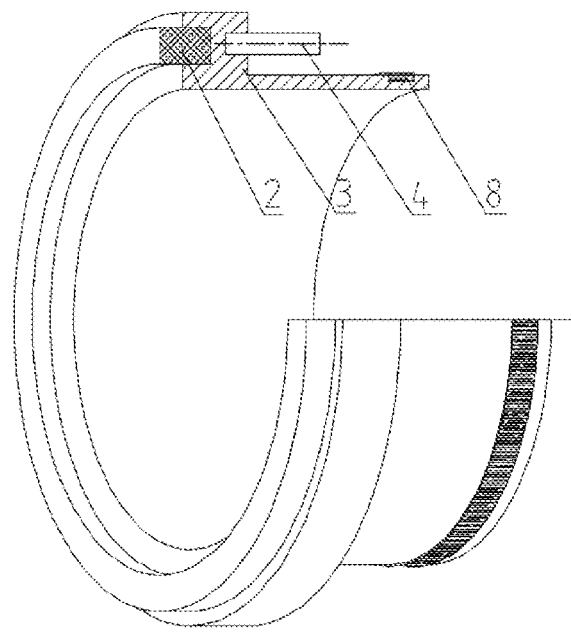
FIG. 3 is the axial cross-sectional view of inlaid connection between the tray sleeve and the static ring in Embodiment I of the invention.
Figure 5:
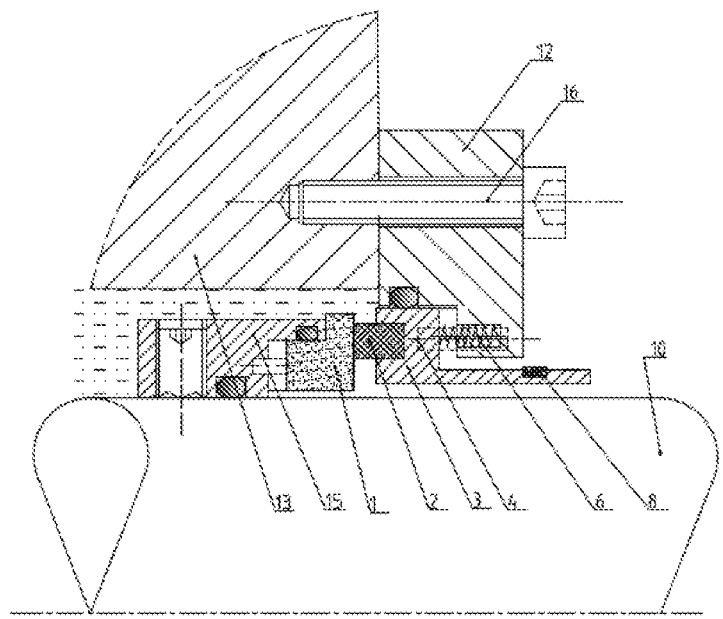
FIG. 5 is the axial cross-sectional view in the application of the split mechanical seal in Embodiment I of the invention.

As shown in FIGS. 3 and 5, the embodiment discloses a static ring compensating mechanical seal for liquid with an axially floating tray sleeve inside. The mechanical seal is used for the seal between the rotating shaft and the shell and specifically comprises a static ring 2, a movable ring 1, a spring 6 and a tray sleeve 3, wherein the spring 6, the static ring 2 and the cover 12 are connected to the shell 13 through a fastening bolt 16, the movable ring 1 is fixed with the shaft 10 through a movable ring seat 15 and rotates, and the contact end faces of the movable ring 1 and the static ring 2 are perpendicular to and slide against the shaft 10 to form a sealing surface. A stepped cylindrical tray sleeve 3 is provided, wherein its bottom tray is provided between the static ring 2 and the cover 12, and its sleeve is parallel to the shaft 10 in the axial direction;

Specifically, as shown in FIG. 3, the tray sleeve 3 has an "L-shaped" cross-section, which includes a bottom tray and a sleeve; the diameter of the tray is greater than that of the sleeve; the tray is positioned between the static ring 2 and the cover 12 with respect to the sleeve protrusion; the tray sleeve 3 is inserted into the static ring 2 near the liquid inner side end (i.e., the bottom of the tray) in the axial direction, the tray sleeve 3 extends out of the mechanical seal cap 12 near the air end in the axial direction, and the sleeve circumference of the exposed part is observed to be provided with a raised warning sign band 8, and the bandwidth corresponds to the effective wear amount between the movable ring 1 and the static ring 2.

The movable ring 1 is an integral or separate structure; The static ring 2 is an integral or separate structure. The integral structure means that the movable ring 1 or the static ring 2 is integral and inseparable; The separate structure means that the movable ring 1 or the static ring 2 is a combination of two separate semi-rings.

The bottom of the tray of the floating tray sleeve 3 of the embodiment is inlaid with the static ring 2, and the anti-rotation pin 4 is arranged in the reverse direction; one end of the spring 6 is connected to the cover 12, and the other end presses the tray of the tray sleeve 3, to prevent the anti-rotation pin 4 from extending through the spring 6 into the inside of the cover 12. The tray sleeve 3 is made from hard metal, plastic, silicon carbide, composite material or any combination of the above materials.

When the exposed part of the tray sleeve enters the sealing body due to the wear of the sealing ring during operation, the axial width of the warning sign band is partly exposed or unexposed, which warns the actual operating condition of the sealing, effectively monitoring the safety performance of the sealing and giving early warning of the sealing failure.

EMBODIMENT II

Figure 1:
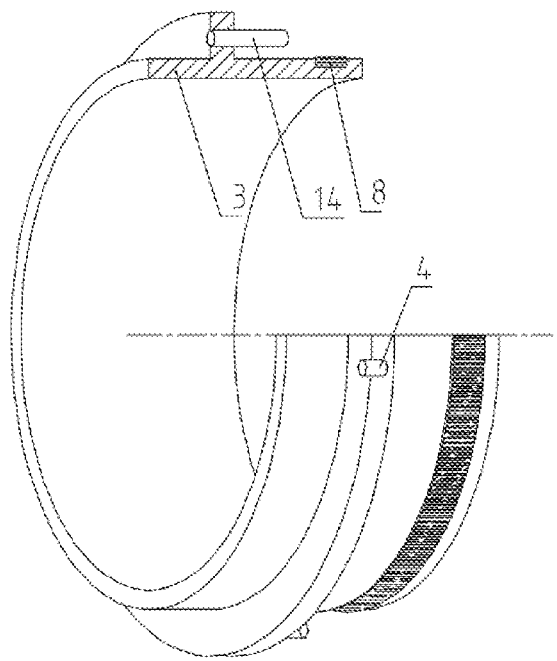
FIG. 1 is the axial cross-sectional view of the structure of the tray sleeve in Embodiment II of the invention.
Figure 4:
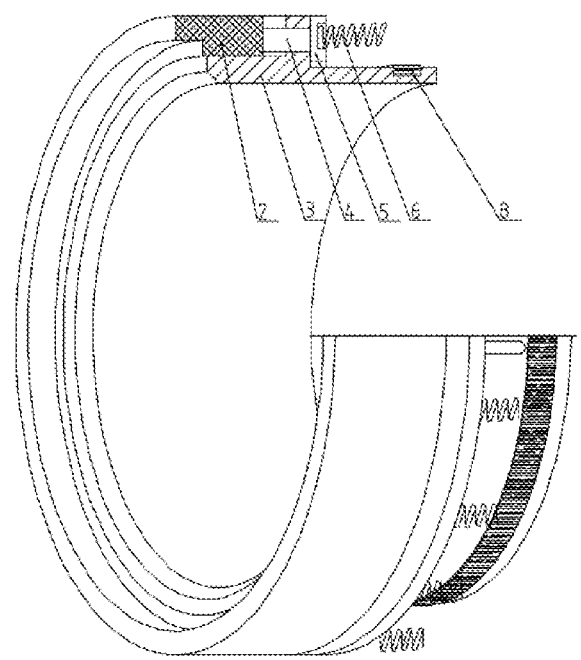
FIG. 4 is the axial cross-sectional view of the structure of the tray sleeve, static ring, baffle ring and spring in Embodiment II of the invention.
Figure 6:
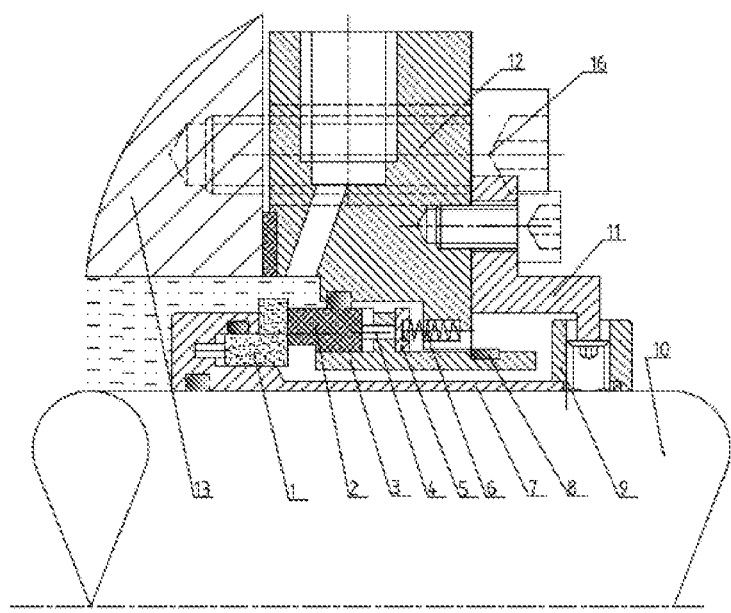
FIG. 6 is the axial cross-sectional view in the application of the cartridge mechanical seal in Embodiment II of the invention.

As shown in FIGS. 1, 4 and 6, the embodiment shows an cartridge static ring compensating mechanical seal formed by the sleeve 7, positioning block 11, locking ring 9 and the cover 12 of the mechanical seal, comprising a static ring 2, a movable ring 1, a spring 6, a tray sleeve 3, wherein the tray sleeve 3, the spring 6, the static ring 2 and the cover 12 are connected to the shell 13 by fastening bolts 16 to be stationary, the movable ring 1 is fixed with the shaft 10 by the sleeve 7 and the locking ring and 9 rotates, and the opposite contact end faces of the movable ring 1 and the static ring 2 are perpendicular to and slide against the shaft 10 to form a sealing surface. A cylindrical tray sleeve (3) is arranged between the static ring (2) and the shaft sleeve (7) in the axial vertical direction and is parallel to the shaft sleeve (7) in the axial direction;

Specifically, as shown in FIG. 1, the cylindrical tray sleeve 3 is provided with an annular protrusion on its outer circumference, which is between the static ring 2 and the cover 12; one end of the spring 6 is connected to the cover 12, and the other end presses against the annular protrusion. An anti-rotation pin 4 is provided on one side of the annular protrusion close to the static ring 2, and the anti-rotation pin 4 is inserted into the static ring 2 to prevent the tray sleeve 3 from rotating relative to the static ring 2. A guide rod 14 is disposed on a side of the annular boss close to the cover 12, and the guide rod 14 extends through the spring 6 into the cover 12. The spring 6 presses the baffle ring 5 for balancing elastic force or preventing falling off at front end of the annular boss, the tray sleeve 3 extends out of the mechanical seal cap 12 near the air end in the axial direction, and the circumference of the exposed portion of the tray sleeve 3 is observed to be provided with a raised warning sign band 8, and the bandwidth corresponds to the effective wear amount between the movable ring 1 and the static ring 2.

When the exposed portion of the tray sleeve 3 enters the sealing body due to the wear of the sealing ring during the operation, the axial width of the warning sign band is partly exposed or unexposed, which warns the actual operating condition of the sealing, effectively monitoring the safety performance of the sealing and giving early warning of the sealing failure.

Embodiment II is a cartridge structure. In this structure, the components of the mechanical seal are assembled in advance. During use, they are installed integrally, the rotating sealing components are connected and fixed with the rotating shaft, and the static sealing components are connected and fixed with the shell. The cartridge mechanical seal has high assembly precision and is easy to install. The effect of monitoring safety performance of seal and giving early warning of seal is superior to that in Embodiment I.

EMBODIMENT III

Figure 2:
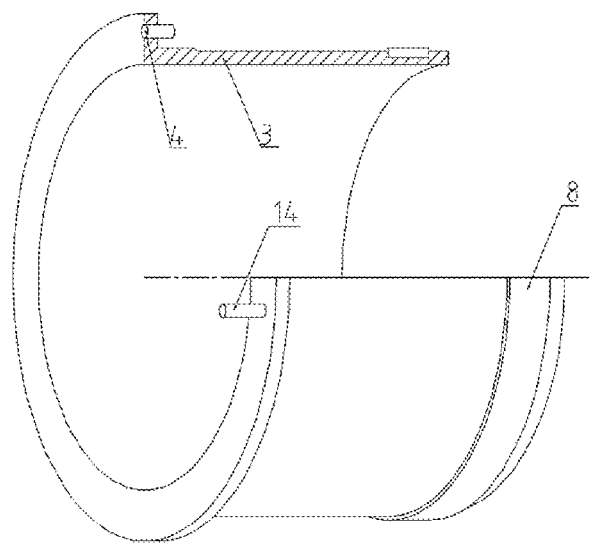
FIG. 2 is the axial cross-sectional view of the structure of the tray sleeve in Embodiments III and IV of the invention.
Figure 7:
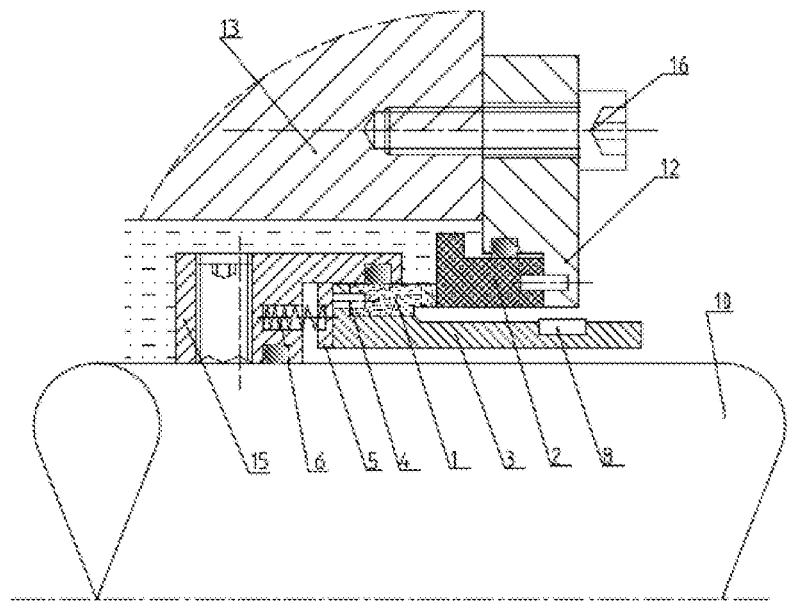
FIG. 7 is the axial cross-sectional view in the application of the split mechanical seal in Embodiment III of the invention.
Figure 9:
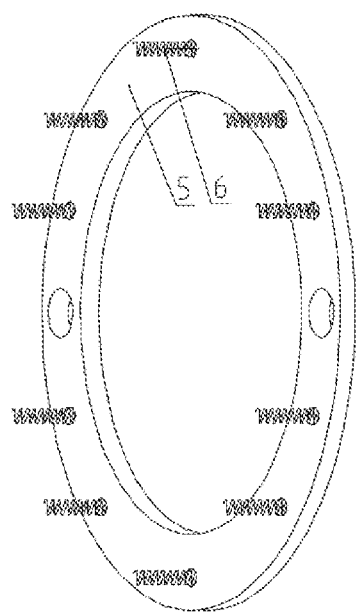
FIG. 9 is the external view of the embodiment of the baffle ring and spring of the present invention.

As shown in FIGS. 2, 7 and 9, the embodiment discloses a movable ring compensating mechanical seal for liquid with an axially floating tray sleeve inside. The mechanical seal is used for seal between the rotating shaft and the shell and comprises a static ring 2, a movable ring 1, a spring 6 and a tray sleeve 3, wherein the static ring 2 and the cover 12 are connected to the shell 13 through a fastening bolt 16, the movable ring 1 and the spring 6 are fixed with the shaft 10 by a movable ring seat 15 and rotate, and the contact end faces of the movable ring 1 and the static ring 2 are perpendicular to and slide against the shaft 10 to form a sealing surface. A cylindrical tray sleeve 3 is provided between the movable ring 1 and the shaft 10 in the radial direction and is parallel to the shaft 10 in the axial direction; The inner end of the tray sleeve 3 near the liquid is connected to the movable ring 1 in the axial direction, the tray sleeve 3 extends out of the mechanical seal cover 12 in the axial direction near the air end, a raised warning sign band 8 is arranged on the periphery of the exposed portion, and the bandwidth corresponds to the friction loss amount between the movable ring 1 and the static ring 2.

The inner side end of the floating tray sleeve 3 of the embodiment is provided with a boss, which connects the floating tray sleeve 3 with the movable ring 1 and the spring 6. The spring 6 presses the boss against the movable ring 1, the boss is provided with a rotation preventing pin 4 toward the movable ring 1. The anti-rotation pin 4 extends into the movable ring 1 so that the movable ring 1 and the tray sleeve 3 do not rotate relative to each other. A guide rod 14 is arranged in the opposite direction. The guide rod 14 passes through the spring 6 and extends into the movable ring seat 15. The front end of the spring 6 is provided with a baffle ring 5 for balancing elastic force or preventing falling off, and the floating tray 3 is made from hard metal, plastic, silicon carbide, composite material or any combination of the above materials.

When the portion of the tray sleeve 3 close to the air in axial direction extends out of the sealing body due to the wear of the sealing ring during operation, the axial width of the warning sign band is partly exposed or all exposed, which warns the actual operating condition of the sealing, effectively monitoring the safety performance of the sealing and giving early warning of the sealing failure.

EMBODIMENT IV

Figure 8:
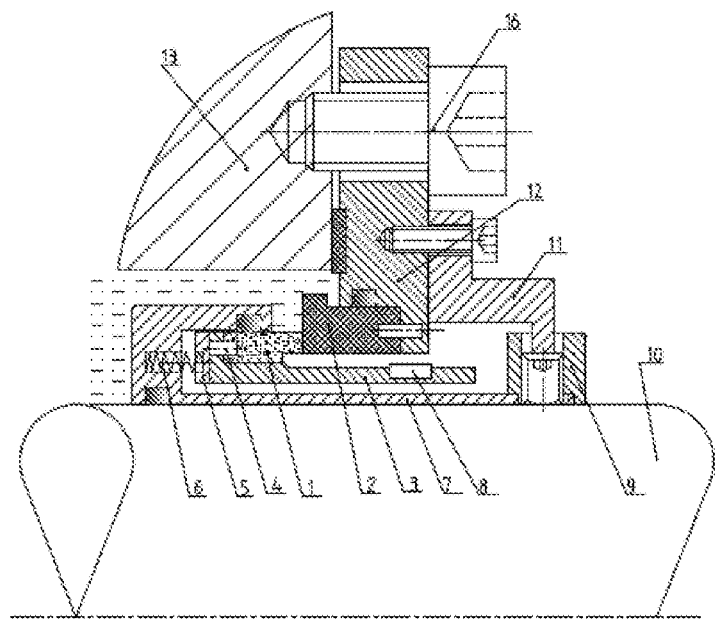
FIG. 8 is the axial cross-sectional view in the application of the cartridge mechanical seal in Embodiment IV of the invention.

As shown in FIGS. 2, 8 and 9, the embodiment forms a cartridge dynamic ring compensating mechanical seal through the sleeve 7, positioning block 11, locking ring 9 and the cover 12 of the mechanical seal, comprising a static ring 2, a movable ring 1, a spring 6, a tray sleeve 3 and the like, wherein the tray sleeve 3, the static ring 2 and the cover 12 are connected to the shell 13 through fastening bolts 16 to be stationary, the movable ring 1 and the spring 6 are fixed with the shaft 10 by the sleeve 7 and the locking ring and 9 rotates, and the opposite contact end faces of the movable ring 1 and the static ring 2 are perpendicular to and slide against the shaft 10 to form a sealing surface. A cylindrical tray sleeve 3 is provided between the movable ring 1 and the shaft 7 in the axial vertical direction and is parallel to the shaft sleeve 7 in the axial direction; the inner end of the tray sleeve 3 near the liquid is connected to the movable ring 1 in the axial direction, the tray sleeve 3 extends out of the mechanical seal cover 12 in the axial direction near the air end, a raised warning sign band 8 is provided on the periphery of the exposed part, and the bandwidth corresponds to the friction loss amount between the movable ring 1 and the static ring 2.

The inner side end of the tray sleeve 3 is provided with a boss, which connects the floating tray sleeve 3 with the movable ring 1 and the spring 6. The spring 6 presses the boss against the movable ring 1, the boss is provided with a rotation preventing pin 4 toward the movable ring 1. The anti-rotation pin 4 extends into the movable ring 1 so that the movable ring 1 and the tray sleeve 3 do not rotate relative to each other. A guide rod 14 is arranged in the opposite direction. The guide rod 14 passes through the spring 6 and extends into the movable ring seat 15. The front end of the spring 6 is provided with a baffle ring 5 for balancing elastic force or preventing falling off, and the floating tray 3 is made from hard metal, plastic, silicon carbide, composite material or any combination of the above materials.

When the portion of the tray sleeve close to the air end in axial direction extends out of the sealing body due to the wear of the sealing ring during operation, the axial width of the warning sign band is partly exposed or all exposed, which warns the actual operating condition of the sealing, effectively monitoring the safety performance of the sealing and giving early warning of the sealing failure.

Embodiments III and IV are movable ring compensating structures in which the tray sleeve is connected to the movable ring for rotation. When the portion of the tray sleeve close to the air in axial direction extends out of the sealing body due to the wear of the sealing ring during operation, the axial width of the warning mark band is partly exposed or all exposed, which warns the actual operating condition of the sealing, effectively monitoring the safety performance of the sealing and giving early warning of the sealing failure.

The embodiments described above are only preferred embodiments of the invention, and it should be noted that those skilled in the art can also make several modifications and variations without departing from the technical principles of the present invention, and such modifications and variations are also considered to be within the scope of the present invention.

What is claimed is:

1. A mechanical seal for sealing against a rotating shaft, said mechanical seal comprising:
   a static ring positioned about said shaft;
   a movable ring positioned about said shaft and in sliding contact with said static ring, said movable ring being rotatable with said shaft;
   a tray sleeve attached to one of said movable ring and said static ring, said tray sleeve being selectively movable in an axial direction along said shaft;
   wherein wear between said static ring and said movable ring causes said tray sleeve to move in said axial direction;
   wherein said tray sleeve includes an indicator; and
   wherein relative movement of said indicator along said shaft is in proportion to said wear between said static ring and said movable ring.

2. The mechanical seal for sealing against a rotating shaft according to claim 1, wherein:
   said tray sleeve is biased with respect to one of said movable ring and said static ring via a spring assembly, said spring assembly comprising one of a cylindrical spring, a coil spring, a wave plate spring, a bellows spring and a disc spring.

3. The mechanical seal for sealing against a rotating shaft according to claim 1, wherein:
   said indicator moves along said shaft in proportion to a wearing of said static ring.

4. A method for indicating wear in a sealing assembly for sealing against a selectively rotating shaft, said method comprising the steps of:
   providing a first ring about said shaft;
   providing a second ring about said shaft and in sliding contact with said first ring;
   fixing one of said first ring and said second ring to be rotatable with said shaft;
   providing a tray sleeve for axial movement along said shaft, said tray sleeve being in communication with one of said first ring and said second ring and having a first portion and a second portion, said first portion being of a different coloration than that said second portion;
   detecting said axial movement of said tray sleeve; and
   determining an amount of said wear between said first ring and said second ring in dependence upon said detected axial movement of said tray sleeve.

5. The method for indicating wear in a sealing assembly for sealing against a selectively rotating shaft according to claim 4, said method further comprising the steps of:
   fixing said tray sleeve to one of said first ring and said second ring; and
   actively biasing said tray sleeve for said axial movement when said wear between said first ring and said second ring occurs.

6. The method for indicating wear in a sealing assembly for sealing against a selectively rotating shaft according to claim 4, said method further comprising the steps of:
   fixing said tray sleeve to one of said first ring and said second ring; and
   spring biasing one of said first ring and said second ring and said tray sleeve for said axial movement when said wear between said first ring and said second ring occurs.

7. A mechanical seal for sealing against a rotating shaft, said mechanical seal comprising:
   a static ring positioned about said shaft;
   a movable ring positioned about said shaft and in sliding contact with said static ring, said movable ring being rotatable with said shaft;
   a tray sleeve attached to one of said movable ring and said static ring, said tray sleeve being selectively movable in an axial direction along said shaft; and
   wherein wear between said static ring and said movable ring causes said tray sleeve to move in said axial direction, thereby exposing a warning portion of said tray sleeve having a coloration different from that of a remainder of said tray sleeve.

8. The mechanical seal for sealing against a rotating shaft according to claim 7, wherein:
   said tray sleeve is biased with respect to one of said movable ring and said static ring via a spring assembly.

9. The mechanical seal for sealing against a rotating shaft according to claim 7, wherein:
   said warning portion is progressively exposed in proportion to a wearing of said static ring.

10. The mechanical seal for sealing against a rotating shaft according to claim 7, wherein:
    said wear between said static ring and said movable ring progressively exposes a greater proportion of said warning portion.

* * * * *